United States Patent
Wachs et al.

(10) Patent No.: US 9,694,658 B2
(45) Date of Patent: Jul. 4, 2017

(54) DEVICE FOR RECEIVING A COVER OF A CONVERTIBLE MOTOR VEHICLE AND MOTOR VEHICLE

(71) Applicant: AUDI AG, Ingolstadt (DE)

(72) Inventors: Mario Wachs, Neuburg (DE); Guido Günthner, Lobsing (DE); Klaus Huber, Geisenfeld (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/861,447

(22) Filed: Sep. 22, 2015

(65) Prior Publication Data

US 2016/0082818 A1 Mar. 24, 2016

(30) Foreign Application Priority Data

Sep. 23, 2014 (DE) .......................... 10 2014 014 090

(51) Int. Cl.
*B60J 7/20* (2006.01)

(52) U.S. Cl.
CPC ............... *B60J 7/202* (2013.01); *B60J 7/207* (2013.01)

(58) Field of Classification Search
CPC ............... B60J 7/20; B60J 7/202; B60J 7/207
USPC ...................................................... 296/107.08
See application file for complete search history.

(56) References Cited

U.S. PATENT DOCUMENTS

| | | | | |
|---|---|---|---|---|
| 4,969,679 | A * | 11/1990 | Eyb ...................... | B60J 7/207 296/124 |
| 5,810,413 | A * | 9/1998 | Siring ..................... | B60J 7/207 160/183 |
| 5,876,083 | A * | 3/1999 | Striegl ..................... | B60J 7/207 296/107.08 |
| 2002/0003359 | A1* | 1/2002 | De Gaillard .......... | B60J 1/1823 296/216.01 |
| 2003/0218346 | A1* | 11/2003 | Dintner .................... | B60J 7/207 296/37.1 |
| 2004/0212213 | A1* | 10/2004 | Guillez .................... | B60J 7/148 296/107.17 |

(Continued)

FOREIGN PATENT DOCUMENTS

| | | |
|---|---|---|
| DE | 10 2004 057 396 | 1/2006 |
| DE | 10 2005 048 256 | 4/2007 |
| DE | 10 2012 012 812 | 12/2012 |

(Continued)

OTHER PUBLICATIONS

Computer generated English translation of EP 1736341.*

(Continued)

*Primary Examiner* — Gregory Blankenship
(74) *Attorney, Agent, or Firm* — Henry M. Feiereisen LLC (57) ABSTRACT

A device for receiving a cover of a convertible motor vehicle includes A device for receiving a cover of a convertible motor vehicle, including a first pivot part and a second pivot part, each being supported on a vehicle body so as to be pivotal between two pivot positions; a floor part fastened on the first pivot part and the second pivot part; and at least one drive device coupling the first and second pivot parts with each other, so that pivot movements of the first pivot part induced by the drive device cause pivot movements of the second pivot part and pivot movements of the second pivot part induced by the drive device cause pivot movements of the first pivot part.

19 Claims, 4 Drawing Sheets

(56) References Cited

U.S. PATENT DOCUMENTS

| | | | | |
|---|---|---|---|---|
| 2008/0067832 A1* | 3/2008 | Bunsmann | ............... | B60J 7/207 296/107.08 |
| 2016/0082818 A1* | 3/2016 | Wachs | ..................... | B60J 7/207 296/107.08 |

FOREIGN PATENT DOCUMENTS

| | | | | |
|---|---|---|---|---|
| EP | 1 736 341 | | 12/2006 | |
| JP | 2006-306265 | * | 11/2006 | ................ B60J 7/20 |

OTHER PUBLICATIONS

Computer generated English translation of DE 102005048256.*
Computer generated English translation of DE 102004057396.*
Computer generated English translation of DE 102012012812.*
European Search Report issued on Feb. 15, 2016 in corresponding European Patent Application No. EP 15 00 2348.
Translation of European Search Report issued on Feb. 15, 2016 in corresponding European Patent Application No. EP 15 00 2348.

* cited by examiner

DEVICE FOR RECEIVING A COVER OF A CONVERTIBLE MOTOR VEHICLE AND MOTOR VEHICLE

CROSS-REFERENCES TO RELATED APPLICATIONS

This application claims the priority of German Patent Application, Serial No. 10 2014 014 090.3, filed Sep. 23, 2014, pursuant to 35 U.S.C. 119(a)-(d), the disclosure of which is incorporated herein by reference.

BACKGROUND OF THE INVENTION

The present invention relates to a device for receiving a cover of a convertible motor vehicle.

The following discussion of related art is provided to assist the reader in understanding the advantages of the invention, and is not to be construed as an admission that this related art is prior art to this invention.

Corresponding devices usually include multiple pivot parts that can be or are pivotally supported on the vehicle body and can be pivoted between two pivot positions. In respective first pivot positions of the pivot parts, a receptacle, which takes up a portion of the luggage compartment of the vehicle, is formed for receiving a convertible cover. In respective second pivot positions of the pivot parts a corresponding receptacle is not formed.

The pivot parts can hereby be pivoted by means of a drive device. The drive device can thus cause the pivot parts to perform pivot movements or to pivot into corresponding pivot positions.

Prior devices are designed relatively complex regarding their function and construction. It would therefore be desirable and advantageous to provide a device for receiving a cover of a convertible motor vehicle, which is improved regarding its function and construction.

SUMMARY OF THE INVENTION

According to one aspect of the invention a device for receiving a cover of a convertible motor vehicle includes A device for receiving a cover of a convertible motor vehicle, including a first pivot part and a second pivot part, each being supported on a vehicle body so as to be pivotal between two pivot positions; a floor part fastened on the first pivot part and the second pivot part; and at least one drive device coupling the first and second pivot parts with each other, so that pivot movements of the first pivot part induced by the drive device cause pivot movements of the second pivot part and pivot movements of the second pivot part induced by the drive device cause pivot movements of the first pivot part.

According to another advantageous feature the pivot movements of the first and second pivot part are oriented in opposite directions.

The device generally serves for receiving a convertible cover, i.e., a cover of a convertible-type motor vehicle.

The pivotal support of the pivot parts enables pivot movements about a pivot axis, which in a properly mounted state of the device on the motor vehicle typically (substantially) extends transverse to the longitudinal axis of the motor vehicle. The pivotal support of the pivot parts thus enables in particular pivot movements relative to the vehicle body.

In a mounted state of the device on a motor vehicle, the first pivot part is typically supported on a first vehicle body part which separates a rear luggage compartment from a passenger compartment, in particular on a rear wall which separates a rear luggage compartment from the passenger compartment. The first pivot part can thus also be regarded or referred to as front pivot part in relation to the longitudinal extent of the motor vehicle. The first pivot part can have a bracket-type, i.e., in particular U-shaped form. In the mounted state of the device on a motor vehicle, the second pivot part is typically supported on a further motor vehicle body part arranged or formed between the first motor vehicle part and the rear of the motor vehicle body. The second pivot part can thus also be regarded or referred to as rear pivot part in relation to the longitudinal extent of the motor vehicle. The second pivot part can have a panel-like, i.e., in particular flat shape.

The pivot parts are typically pivotal between two pivot positions. Each pivot part can thus be pivoted into two defined pivot positions. In a properly mounted state of the device on the motor vehicle, a receptacle for receiving a cover of the motor vehicle can be or is formed in a respective first pivot position of the first and second pivot part, which takes up a portion of the or a rear luggage compartment or trunk. The receptacle may in particular be trough-shaped. On the other hand, in a respective second pivot position of the first and second pivot part typically no such receptacle for receiving a cover of the motor vehicle can be or is formed. The rear luggage compartment available for storing items, in particular luggage items, is typically smaller in the respective first pivot position of the two pivot parts than in the respective second pivot position of the pivot parts.

The first pivot part when pivoted into the first pivot position typically has a different spatial position or orientation than the second pivot part when pivoted into this first pivot position. The same applies to the respective second pivot positions. Correspondingly the two pivot parts typically have different spatial orientations or arrangements in their respective first or second pivot positions, i.e., they are in particular not arranged or oriented parallel to each other.

The pivot parts generally are components configured in the manner of a pivot arm or pivot frame. As mentioned above, the first pivot part can have a bracket-like shape and the second pivot part can have a panel-like shape. The pivot parts can be constructed one-piece or in multiple pieces. The pivot parts can be made of plastic, for example polyamide or polycarbonate, or metal, for example aluminum or steel.

The floor part that is part of the device is or can be fastened on both pivot parts. The two pivot parts and the floor part can thus be regarded or referred to as a pivot arrangement. The floor part can be at least partially made from a flexible or textile-type floor-part-element or multiple interconnected, at least partially flexible, or textile-type floor-part-elements. Generally the floor part or the corresponding floor-part-elements can be made at least partially from a non-flexible, i.e., rigid material.

Typically the floor part is fastened on the first pivot part by means of a known windup-device. The windup-device ensures that the floor part is constantly held under a defined tensile stress or stretched. In this way, distance- or length differences between the first and the second pivot part can be compensated in the respective pivot positions.

The first pivot part can serve as receptacle for a corresponding windup-device. In the windup-device a portion of the floor part can be wound up in order to compensate distance differences between the first and the second pivot part in the respective different pivot positions, as mentioned above.

The device further includes a drive device. Via the drive device or via at least one functional element of the drive device, a direct mechanical connection of the two pivot parts to each other, and in particular a direct coupling of the movements of the two pivot parts, is realized. Due to the coupling of the movements of the pivot parts, movements of the first pivot part, in the present case typically pivot movements, directly cause movements the second pivot part, presently typically pivot movements, and vice versa. Thus pivot movements induced by the drive device into a pivot part, for example the first of the part, cause pivot movements, in particular in opposite direction, of the respective other pivot part, for example the second pivot part, or vice versa. Concretely, clockwise pivot movements of the first pivot part thus typically cause counterclockwise pivot movements of the second pivot part and vice versa.

Corresponding pivot movements can be introduced into the first or second pivot part directly via a drive of the drive device as (further) functional element of the drive device, for example in the form of an electric drive motor or a drive hydraulic. It is also possible that the or a drive is directly coupled with the first or second pivot part so that via the drive a pivot movement can be introduced into the first or second pivot part that is directly coupled with the drive, wherein a pivot movement which is introduced into the first or second pivot part that is directly coupled to the drive causes a pivot movement, in particular in an opposite direction, of the first or second pivot part that is not directly coupled with the drive and vice versa.

Between the drive and the first or second pivot part a coupling device for example in the form of a multiple disc clutch, friction clutch or sliding clutch, can be arranged via which the coupling between the drive and the first or second pivot part can be released temporarily or as required. Via the coupling device a force fitting and/or formfitting releasable coupling between the drive and the first or second pivot part can be formed or generated.

The coupling device is advantageously configured so that it releases the coupling of the drive with the first or second pivot part when a load exceeds a coupling-device specific load and to reengage the coupling when the load falls below the a coupling-device specific load. This can for example be realized by means of one or multiple pretensioned spring elements, which bias a coupling element of the drive of the coupling device against a coupling element of the coupling device on the pivot part. The "automatic" disengagement of the coupling in the case of exceeding the defined coupling-device specific load, enables preventing damage to the device i.e., in particular the pivot parts and/or the drive device as the result of motor load situations, for example in the case of inappropriate operation of the device.

The connection between the two pivot parts and coupling of their movements provided by the drive device remains ensured in all cases.

It is also possible that pivot movements are indirectly introduced into the first and/or second pivot part via an already mentioned drive means which is coupled with the or a drive-device-side drive and the first and/or second pivot part. Such a drive means can thus be referred to or regarded as a functional element of the drive device which is arranged between the drive and the respective pivot parts. It is also possible that the or a drive is directly coupled with the drive means so that via a drive of the drive means pivot movements, in particular in opposite directions, can be introduced into the first and the second pivot part.

A corresponding drive of the drive device can be directly arranged on or in the first or second pivot part. In this way a particularly space-saving arrangement or configuration, or general integration, of a corresponding drive into the device can be realized.

Overall a functionally and constructively simplified, and thus improved, principle of a corresponding device for receiving a cover of a convertible car is provided. In particular it is possible to pivot the pivot parts by means of the drive device fully automatically between respective pivot positions, in order to form or un-form a corresponding receptacle for a cover.

As mentioned above, the drive device can include a drive means as a functional element of the drive device. As also mentioned above, the two pivot parts can be interconnected or their movements coupled via the drive means in such a manner that pivot movements of the first pivot part induced via the drive device, cause pivot movements, in particular movements in opposite directions, of the second pivot part or vice versa.

A corresponding drive means thus typically interacts on one hand with a drive, for example in the form of the drive motor, and on the other hand with the two pivot parts. A drive energy can be transmitted to the drive means via the drive typically a drive torque. The drive energy transmitted to the drive means can be further transmitted to the pivot part so that the pivot parts are caused to perform a corresponding pivot movement. The drive means is thus suited to generally transmit forces or torques. Correspondingly the drive means can for example be constructed as a drive belt, a drive chain or a drive cable. The respective configurations of the drive means can be made of plastic for example polyamide, or metal, for example steel.

According to another advantageous feature of the invention, drive elements can be arranged on the two pivot parts in rotative fixed relationship with the pivot parts. The drive means can loop around regions of corresponding drive elements that are arranged on the pivot parts in rotative fixed relationship with the pivot parts. The looping of the drive means around the drive elements on the pivot parts makes it possible to transmit a corresponding drive energy onto the drive elements and with this the pivot parts. The looping of the drive means on the drive elements on the pivot parts thus establishes an operative connection between the drive and the pivot parts.

The respective drive elements on the pivot parts are typically constructed as roller-type deflection elements. The looping of the drive elements thus typically causes a redirection of the longitudinal orientation of the drive means.

The respective deflection elements can have the same or different dimensions, in particular outer circumferences. Via different dimensions i.e., in particular via different order circumferences of the respective deflection elements on the pivot parts it is possible to realize pivot movements of the first and second pivot parts with different angular velocities in the manner an increase or decrease of transmission ratios in a targeted manner.

The device can further include a clamping device which is configured for tensioning the drive means. Via the tensioning device, i.e., for example a spring that cooperates with the drive means, manufacturing-related and/or operation-related in particular temperature-related length tolerances of the drive means can thus be compensated. At the same time the drive means can always be kept under a defined pretension. In this way noise, for example clattering noise, that may be perceived as unpleasant by vehicle occupants can be prevented.

According to another aspect of the invention, a convertible motor vehicle, includes a cover and a device for receiving the cover, wherein the device includes a first pivot part supported on a vehicle body so as to be pivotal between two pivot positions; a second pivot part supported on the vehicle body so as to be pivotal between two pivot positions; a floor part fastened on the first pivot part and the second pivot part; and at least one drive device via which the two pivot parts are interconnected and their movements are coupled, so that the movements of the first pivot part induced by the drive device, cause pivot movements, in particular in opposite direction, of the second pivot part and vice versa.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
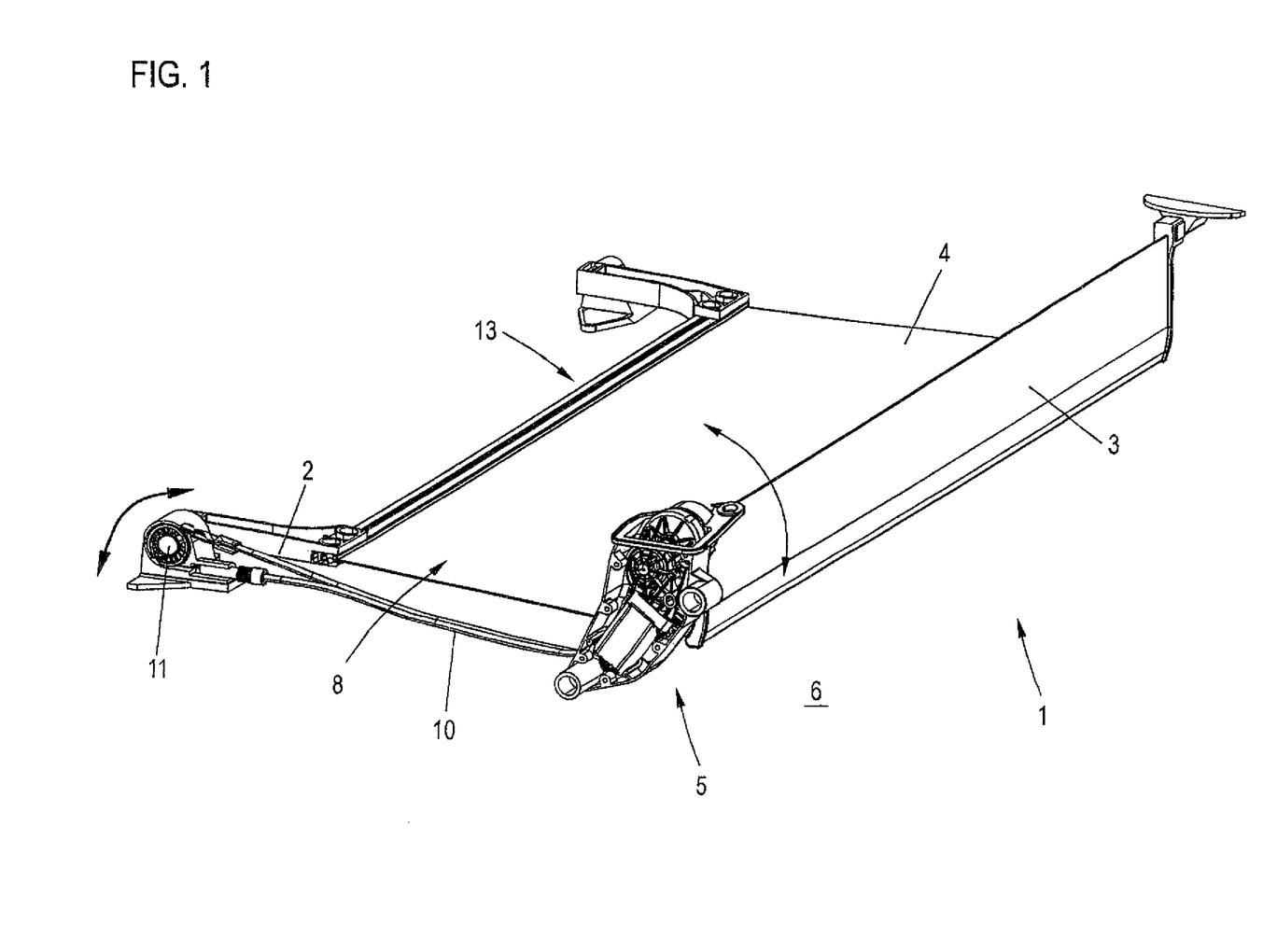
FIG. 1 shows a perspective view of an exemplary embodiment of the device according to the invention with the pivot parts in a first position.

Turning now to the drawing, and in particular to FIG. 1, there is shown an perspective view of an exemplary embodiment of the device 1 according to the invention. The device 1 serves for receiving a cover (not shown) of a convertible-type motor vehicle (not shown). The device 1 includes as essential components a bracket-type first pivot part 2, a panel-type second pivot part 3, a floor part 4 which is fastenable or fastened on the pivot parts 2, 3, and a drive device 5.

As indicated by the double arrows, the pivot parts 2, 3 are each pivotal into or between two pivot positions relative to the motor vehicle body about a pivot axis, which extends transverse to the longitudinal direction of the motor vehicle.

Figure 2:
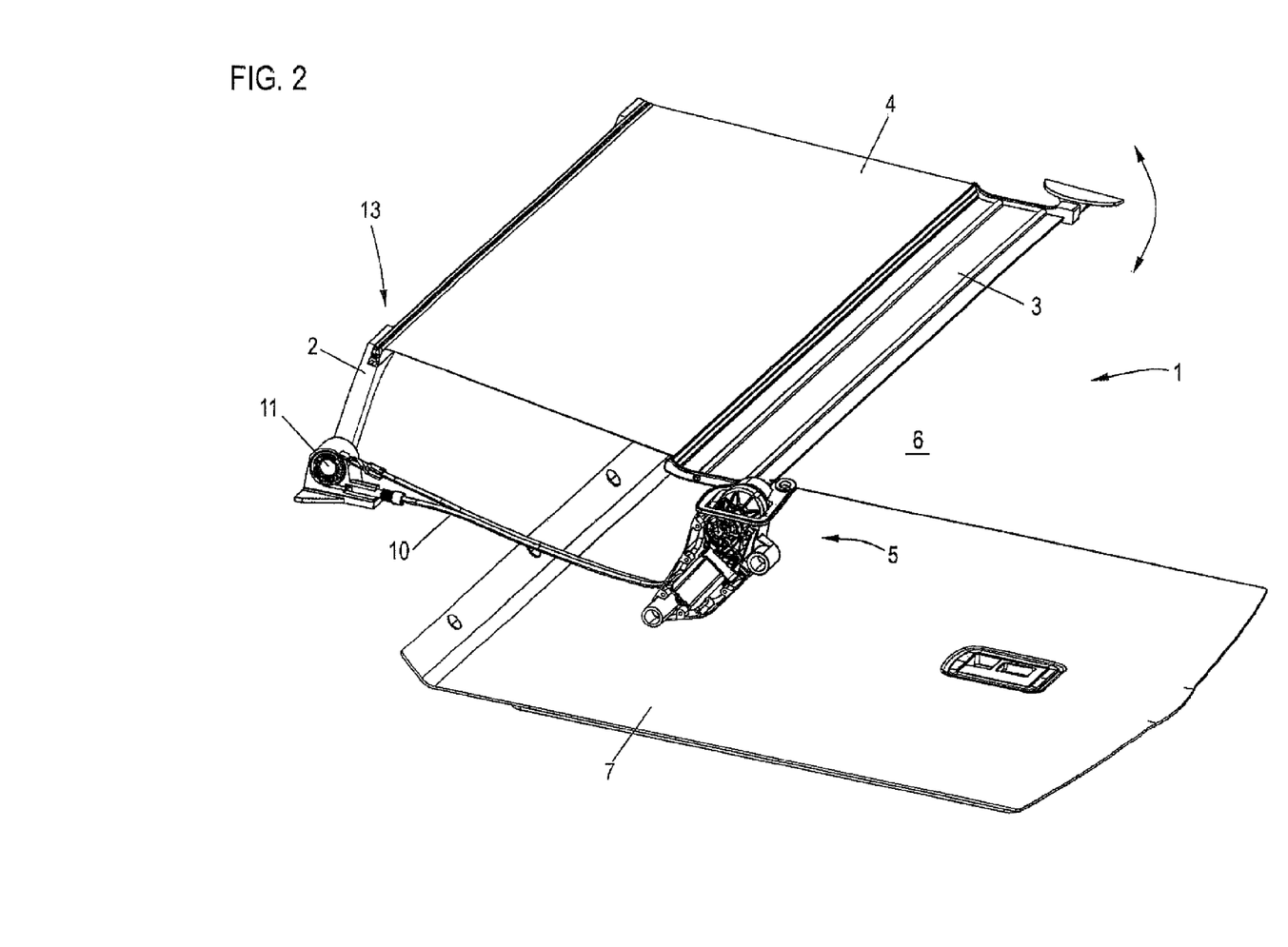
FIG. 2 shows a perspective view of the exemplary embodiment of FIG. 1 with the pivot parts in another position

The first pivot part 2 is supported on a vehicle body part (not shown), which separates a rear luggage compartment 6 from a passenger compartment. The motor vehicle body part typically is a rear wall which separates the rear luggage compartment 6 from a passenger compartment. In FIG. 2 only the luggage compartment floor 7 of the luggage compartment is shown. The second pivot part 3 is supported on a further vehicle body part (not shown), which is arranged between the vehicle body part that separates the luggage compartment 6 from the passenger compartment and the rear of the vehicle body.

As can be seen in FIGS. 1 and 2, the pivot parts 2, 3 are each pivotal between two pivot positions. Each pivot part 2, 3 can thus be pivoted into two defined pivot positions. In a respective first pivot position of the first and second pivot part 2, 3 a receptacle 8, in particular a trough-shaped receptacle, for receiving the cover of the motor vehicle, which takes up a part of the or a luggage compartment 6, can be or is formed (see FIG. 1). In the respective first pivot position of the pivot parts 2, 3 the cover is typically open. Correspondingly in a second respective pivot position of the first and second pivot part 2, 3 no such receptacle 8 for receiving the cover of the motor vehicle can be or is formed (see FIG. 2). In the respective second pivot position of the pivot parts 2, 3 the cover is typically closed.

The rear luggage compartment 6 for storing items is thus smaller in the respective first pivot position of the two pivot parts 2, 3 (see FIG. 1) than in the respective second pivot position of the pivot parts 2, 3 (see FIG. 2). FIGS. 1, 2 also show that the pivot parts 2, 3 have different orientations relative to each other in the first and second pivot positions.

Figure 3:
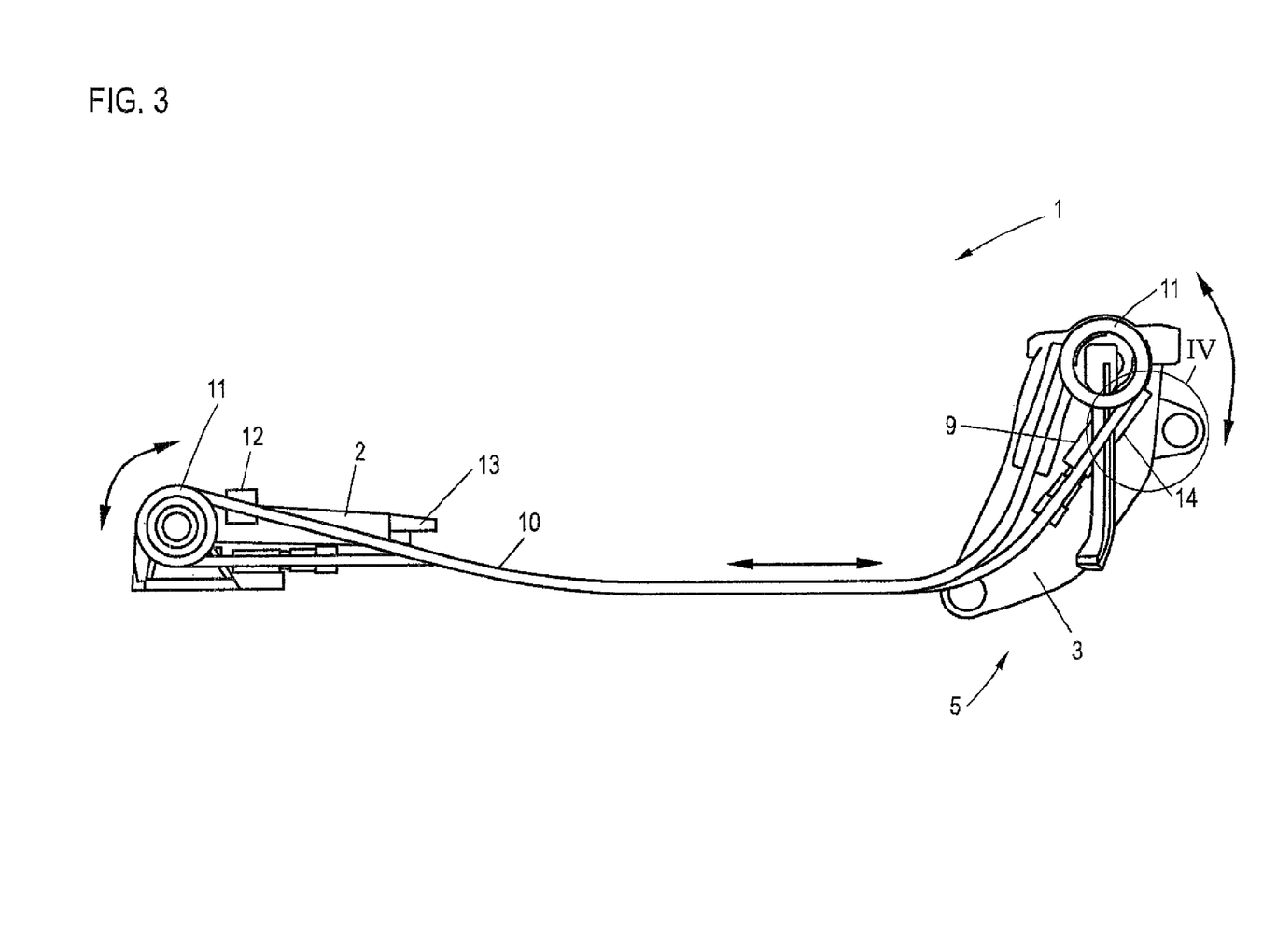
FIG. 3 shows a side view of the exemplary embodiment device according to the invention.

The pivoting of the pivot parts 2, 3 is caused by the drive device 5, which includes as essential functional components a drive 9, here in the form of an electric motor, and a drive device 10, here in the form of a drive cable (see FIG. 3). As can be seen, the drive 9 is directly arranged on the second pivot part 3 (see FIG. 3).

The pivot parts 2, 3 are interconnected and their movements coupled via the drive device 5, i.e., the drive means 10 of the drive device 5. The coupling of the movements of the pivot parts 2, 3 means that pivot movements of the first pivot part 2 induced via the drive device 5 cause pivot movements of the second pivot part 3 in opposite direction or vice versa.

As can be seen in particular in FIG. 3, the pivot parts 2, 3 respectively include tried elements 11, here in the form of deflection rolls, which are arranged on the outside of the pivot parts in rotative fixed relationship with the pivot parts. The drive means 10 loop around regions of an outer circumference of the drive elements 11—in other words the drive means 10 is guided about the outer circumference of the drive elements 11—which results in the described interconnection of the pivot parts 2, 3 and coupling of their movements.

The drive 9 is directly arranged on the second pivot part 3 and is directly coupled with the second pivot part 3 so that via the drive a pivot movement can be introduced into the second pivot part 3 which is directly coupled to the drive 9, wherein a pivot movement that is directly introduced into the pivot part 3 that is directly coupled with the drive 9, causes pivot movements, in particular in opposite direction, of the first pivot part 2 that is not directly coupled to drive 9.

Figure 4:
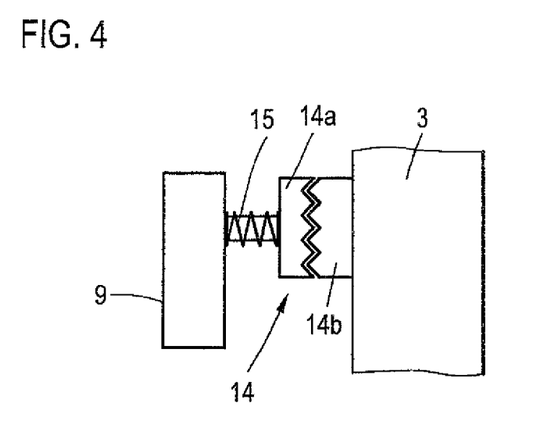
FIG. 4 shows an enlarged representation of the detail IV shown in FIG. 3.

According to another advantageous feature of the invention a coupling device 14, for example in the form of a multiple disc clutch, friction clutch or sliding clutch, can be arranged between the drive 9 and the second pivot part 3, via which coupling device 14 the coupling between the drive 9 and the second pivot part 3 can be released temporarily or as needed (see FIG. 4). Via the coupling device 14 generally a force-fitting and/or formfitting releasable coupling between the drive 9 and the second pivot part 3 can be established.

The coupling device 14 is configured so that the coupling of the drive 9 with the second pivot part 3 is released when a load exceeds a defined or coupling-device-specific load and is reengaged when the load falls below a defined or coupling-device-specific load. This can be realized by means of one or multiple pretensioned spring elements 15, which bias a drive-side coupling element 14a of the coupling device 14 against a pivot part-side coupling element 14b of the coupling device 14. As a result of the "automatic" release of the coupling when exceeding the defined or coupling-device-specific load, damage to the device 1, i.e., in particular of the two pivot parts 2, 3 or the drive device 5 as a result of an externally introduced loads, for example in the case of improper operation of the device, can be prevented.

The interconnection of the two pivot parts 2, 3 and the coupling of their movements realized by the drive device 5 remains ensured in all cases.

According to another advantageous feature of the invention, pivot movements can be introduced into the first and/or second pivot part 2, 3 via the drive means 10 that is coupled with the drive 9 and the first and/or second pivot part 2, 3. A drive energy, typically a drive torque, can be transmitted to the drive means 10 via the drive 9 and from the drive means 10 further to the pivot parts 2, 3, so that these are caused to perform corresponding pivot movements. Of course it is also possible to drive the drive means 10 clockwise with the drive 9 as well as counterclockwise, which is indicated by the double-arrow in FIG. 3. It is also possible that the drive 9 is directly coupled with the drive means 10 via a drive of the drive means 10, so that pivot movements, in particular in opposite directions, can be introduced into the first and the second pivot part 2, 3.

According to another advantageous feature of the invention, the described pivot drive of the pivot parts 2, 3, which is realized via the drive device 5, can be provided on both sides, i.e., on the left side and also on the right side of the longitudinal axis of the motor vehicle.

The drive elements 11 on the pivot parts can have different dimensions, in particular different outer circumferences. In this way, i.e., in particular by using different outer conferences of the deflection elements, it is possible to realize pivot movements of the two pivot parts 2, 3 with different angular velocities in the sense of higher and lower transmission ratios in a targeted manner. Thus different angles can be covered for reaching defined pivot positions.

The device 1 also includes a tensioning device 12 configured for tensioning the drive means 10. Via the tensioning device 12, here in the form of a spring that interacts with the drive means 10, for example manufacturing-related and/or operation-related, in particular temperature-related, length tolerances of the drive means 10 can be compensated. Likewise the drive means 10 can be constantly kept under a defined pretension. In this way noise, for example clattering noise that may be perceived unpleasant by legal occupants, can be prevented.

The floor part 4 can be fastened on the first pivot part 2 via a wind-up device 13. Also conceivable is a direct connection on the first pivot part 2 when there are no distance or length differences in the respective end positions. This depends on the respective construction and specifications of the motor vehicle, i.e., for example the luggage compartment or trunk volume, however, it is also technically possible.

The wind-up device 13 ensures that the floor part 4, which is made of a flexible or textile-type floor-part-element or multiple interconnected flexible or textile-type-floor-part elements, is constantly maintained under a certain pull-tension and thus kept tensioned. In this way distance and length differences between the first and the second pivot part 2, 3 in the respective pivot positions can be compensated.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A device for receiving a cover of a convertible motor vehicle, comprising:
   a first pivot part and a second pivot part, each being supported on a vehicle body so as to be pivotal between two pivot positions;
   a floor part fastened on the first pivot part and the second pivot part; and
   at least one drive device coupling the first and second pivot parts with each other, so that pivot movements of the first pivot part induced by the drive device cause pivot movements of the second pivot part and pivot movements of the second pivot part induced by the drive device cause pivot movements of the first pivot part; and
   at least one drive means, via which the two pivot parts are connected and motion coupled so that the movements of the first pivot part induced by the drive device cause pivot movements, in particular oriented in opposite direction, of the second pivot part and vice versa, wherein the drive device comprises a drive, said drive being directly formed in or on the first or second pivot part.

2. The device of claim 1, wherein the pivot movements of the first and second parts are oriented in opposite directions in particular in opposite directions.

3. The device of claim 1, further comprising drive elements respectively arranged on the pivot parts in rotative fixed relationship with the pivot parts, said drive means being guided about regions of the drive elements.

4. The device of claim 3, wherein the drive elements are configured as deflection elements.

5. The device of claim 3, wherein the drive elements are configured as roll-type deflection elements.

6. The device of claim 5, wherein the deflection elements have same or different dimensions.

7. The device of claim 5, wherein the deflection elements have same or different outer circumferences.

8. The device of claim 1, wherein the at least one drive means is configured as one of a drive belt, a drive chain and a drive cable.

9. The device of claim 1, further comprising a tensioning device configured for tensioning the drive means.

10. The device of claim 1, wherein the drive is coupled directly with the first or second pivot part so that a pivot movement introduced with the drive into the first or second pivot part directly coupled with the drive, wherein a pivot movement introduced into the first or second pivot part directly coupled with the drive causes a pivot movement, in particular in opposite direction, of the first or second pivot part not directly coupled with the drive.

11. The device of claim 1, wherein the drive is directly coupled with the drive means so that pivot movements are introducible into the first and the second pivot part via a drive of the drive means.

12. The device of claim 10, wherein the pivot movements are directed in opposite directions.

13. The device of claim 1, further comprising a coupling device arranged between the drive of the drive device and the first and second pivot part.

14. The device of claim 1, wherein in a mounted state of the device on a motor vehicle the first pivot part is supported on a first vehicle body part which separates a rear luggage compartment from a passenger compartment, and the second pivot part is supported on a second vehicle body part which is arranged or formed between the first vehicle body part and a rear of the vehicle body.

15. The device of claim 14, wherein the first vehicle body part is a rear wall of the motor vehicle, which separates the rear luggage compartment from the passenger compartment.

16. The device of claim 1, wherein in a mounted state of the device on the motor vehicle, a receptacle is formed in a respective first pivot position of the first and second pivot part for receiving a cover of the motor vehicle, said receptacle occupying a portion of a rear luggage compartment, and in a respective second pivot position of the first and second pivot part no receptacle for receiving the cover of the motor vehicle can be or is formed.

17. The device of claim 16, wherein the receptacle is trough-shaped.

18. The device of claim 1, wherein the floor part is at least partially made of a flexible floor part element or multiple interconnected at least partially flexible floor part elements.

19. A convertible motor vehicle, comprising:
a cover and a device for receiving the cover said device comprising
a first pivot part and a second pivot part, each being supported on a vehicle body so as to be pivotal between two pivot positions;
a floor part fastened on the first pivot part and the second pivot part; and
at least one drive device via which the two pivot parts are interconnected and their movements are coupled, so that the movements of the first pivot part induced by the drive device, cause pivot movements, in particular in opposite direction, of the second pivot part and pivot movements of the second pivot part induced by the drive device cause pivot movements of the first pivot part; and
at least one drive means, via which the two pivot parts are connected and motion coupled so that the movements of the first pivot part induced by the drive device cause pivot movements, in particular oriented in opposite direction, of the second pivot part and vice versa, wherein the drive device comprises a drive, said drive being directly formed in or on the first or second pivot part.

* * * * *

UNITED STATES PATENT AND TRADEMARK OFFICE
CERTIFICATE OF CORRECTION

PATENT NO. : 9,694,658 B2  
APPLICATION NO. : 14/861447  
DATED : July 4, 2017  
INVENTOR(S) : Mario Wachs et al.

Page 1 of 1

It is certified that error appears in the above-identified patent and that said Letters Patent is hereby corrected as shown below:

In the abstract, Line 2: please remove "A device for receiving a cover of a convertible motor vehicle, including".

Signed and Sealed this  
Twenty-sixth Day of September, 2017

Joseph Matal  
*Performing the Functions and Duties of the*  
*Under Secretary of Commerce for Intellectual Property and*  
*Director of the United States Patent and Trademark Office*